Dec. 29, 1964   J. C. FARQUHAR   3,163,248
WEIGHING MACHINE
Filed Jan. 27, 1961   2 Sheets-Sheet 1
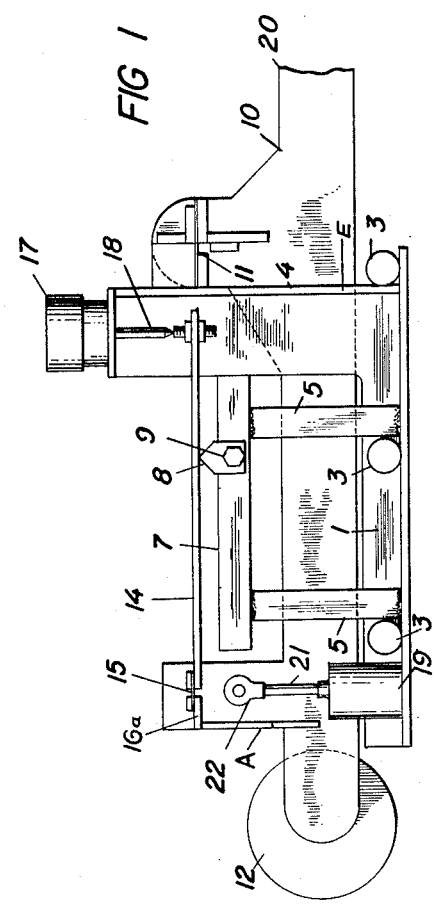
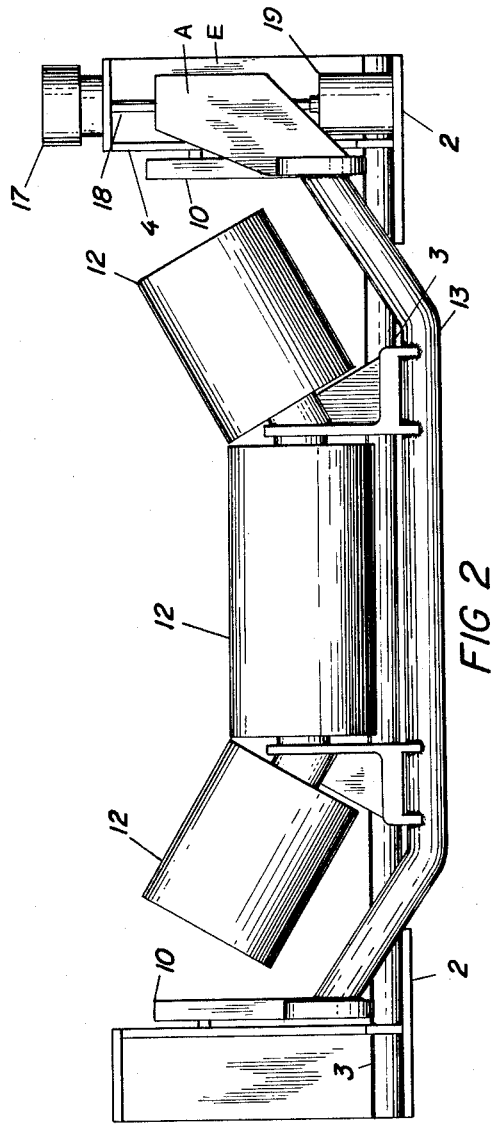
INVENTOR
John Churchill Farquhar
ATTORNEYS Dec. 29, 1964   J. C. FARQUHAR   3,163,248
WEIGHING MACHINE
Filed Jan. 27, 1961   2 Sheets-Sheet 2
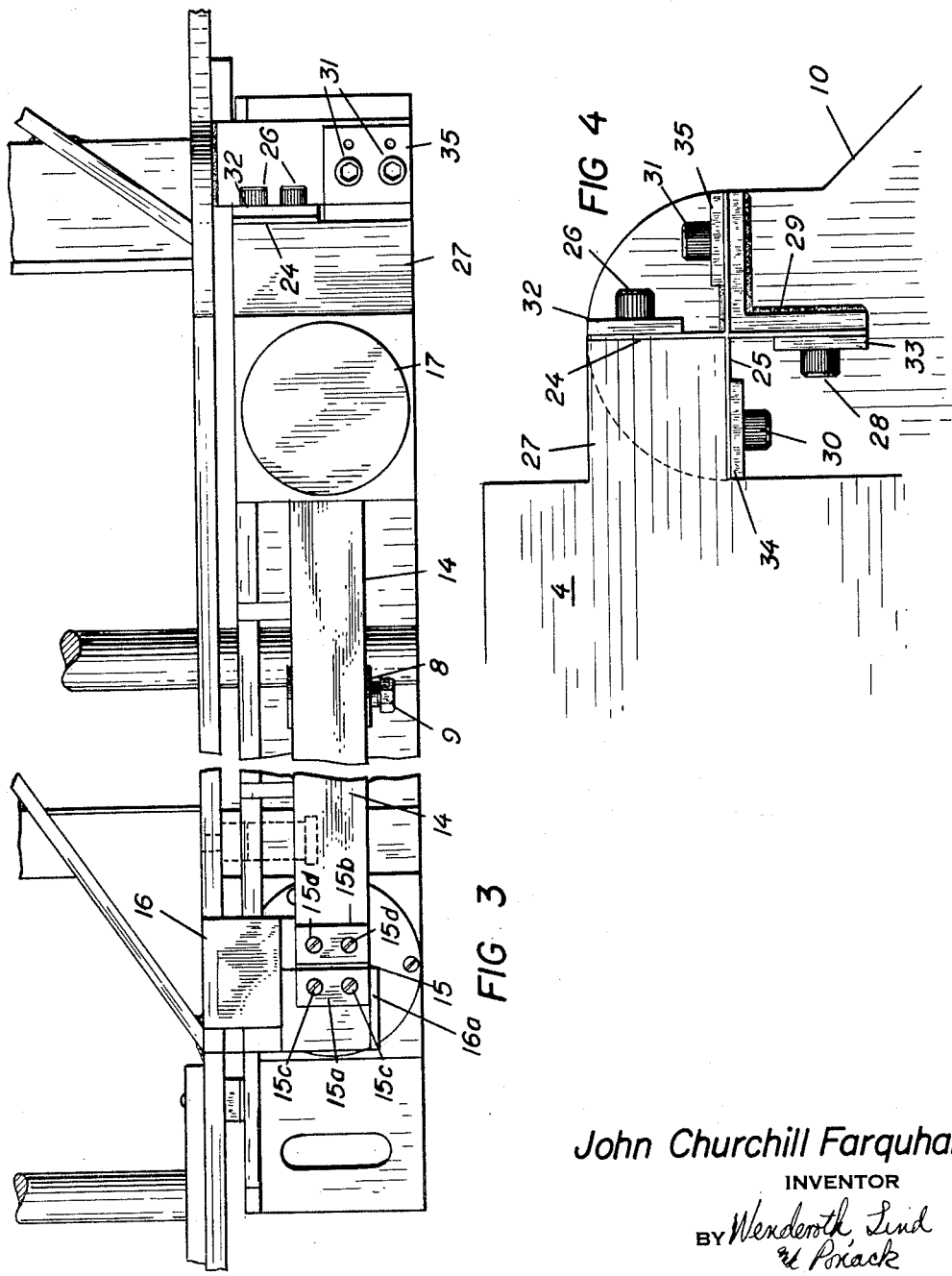
John Churchill Farquhar
INVENTOR
BY Wenderoth, Lind
& Ponack
ATTORNEYS

United States Patent Office 3,163,248
Patented Dec. 29, 1964

3,163,248
WEIGHING MACHINE
John Churchill Farquhar, Felixstowe, Suffolk, England, assignor to Fisons Fertilizers Limited, Felixstowe, Suffolk, England, a British company
Filed Jan. 27, 1961, Ser. No. 85,396
Claims priority, application Great Britain, Jan. 28, 1960, 3,038/60
7 Claims. (Cl. 177—132)

The present invention relates to a weighing machine adapted to measure continuously the load on a conveyor belt.

In weighing machines which measure the load on a conveyor belt, the lever system used to transmit the weight of the load to the instrument used for recording or indicating the weight is subjected to oscillations which, if undamped, prevent the attainment of a steady reading by the instrument. Furthermore the range of weights which such instruments will register is limited. The machine of the present invention is designed to damp the lever system at the same time being easily adjustable to accept a variety of loads.

Accordingly the present invention is for a weighing machine adapted to measure continuously the load on a given length of a conveyor belt, said machine comprising a lever system, a support for the lever system, means attached to the load arm of the lever system which bears against the underside of the given length of conveyor belt and means on the power arm of the lever system to actuate an instrument adapted to respond to variations of force applied to it, wherein vibrations in the lever system are damped by the provision of a dashpot between the load arm of the lever system and the support for the lever system and by the provision of a degree of flexibility in the lever system at least in the power arm of the lever system.

Preferably the above lever system comprises a flexible lever pivoted about a fulcrum and a main frame balanced about a pivot, said main frame being hinged to the load arm of the flexible lever, said dashpot and said means bearing against the underside of the given length of conveyor belt being incorporated with the main frame and said means actuating said instrument being attached to the power arm of the lever.

The present invention is also for a weighing machine adapted to measure continuously the load on a given length of a conveyor belt said machine comprising a supporting structure, a lever system embodying at least one class, one lever, at least the terminal power arm of the lever system being constructed of a flexible material, an instrument adapted to respond to variations of force applied to it, a dashpot and an idler roller, said instrument being supported by said supporting structure, the thrust rod of the load cell being connected to the terminal power arm of said lever system, said dashpot being connected between the terminal load arm of said lever system and said supporting structure and said idler roller being adapted to bear against the underside of the given length of conveyor belt and being attached to the terminal load arm of the lever system.

A preferred embodiment of the invention is for a weighing machine adapted to measure continuously the load on a given length of a conveyor belt, said machine comprising a supporting structure, a fulcrum on the supporting structure, a flexible lever pivoted about the fulcrum, an instrument adapted to respond to variations of force applied to it attached to the supporting structure, means on the power arm of the flexible lever to actuate the instrument, a hinge on the load arm of the flexible lever coupled to a main frame, said main frame being balanced about a pivot attached to the supporting structure, a dashpot between the main frame and the supporting structure, said dashpot damping the vertical movement of the main frame about the pivot and means at one end of the frame which bears against the underside of the length of conveyor belt.

In the above preferred embodiment of the invention the hinge is preferably coupled to the main frame at a position between the pivot and that end of the main frame which bears against the underside of the length of conveyor belt. Preferably also the flexible lever is in the same horizontal plane as the pivot. This is so in order to avoid lateral motion of the flexible lever relative to the fulcrum on deflection which would alter the relative lengths of the lever arms and thus render the reading of the instrument not strictly proportional to load.

The means bearing against the underside of the conveyor belt is suitably an idler roller which may be flat or troughed.

The instrument used to measure variations in force is very desirably a pressure transducer. The pressure transducer is preferably a pneumatic force-balance transmitter capable of converting changes of applied force into changes in output air pressure substantially without displacement, for example with displacements of the order of one thousandth inch. Alternatively the load cell may be a hydraulic force-balance transmiter or a strain gauge.

In the machine of the present invention the fulcrum may be fixed in relation to the lever but it is preferably positionable along the length of the lever. For heavy loads the adjustable fulcrum is positioned near the load end of the lever and for lighter loads the fulcrum is moved towards the power end of the lever. In this way the vertical movement of the load end of the lever can be maintained within maximum limits thus obtaining constant damping effect from the dashpot. The movement of the power end of the lever is of the order of one thousandth of an inch which is fixed by the characteristics of the force-balance pressure transducer employed.

The effect obtained by the use of an adjustable fulcrum may also be obtained either by adjusting the position at which the load is applied to the flexible lever or by adjusting the position of the pressure transducer on the power arm of the flexible lever. In other words the lengths of the power arm and/or the load arm may be varied in any suitable way.

The dashpot used in the weighing machine of the present invention usually consists of a plunger moving in an oil-filled cylindrical container. An adjustable orifice in the plunger controls the rate of flow of oil past the plunger the motion of which is consequently considerably damped. The dashpot is so positioned that movement of the plunger is between 0.02 inch and 0.1 inch.

A flexible lever is one which, for a given weighing machine measuring a given range of loads, will be sufficiently flexible to allow a minimum movement of the dashpot plunger and at the same time allow virtually no movement of the lever at the pressure transducer. The degree of flexibility is therefore determined from a consideration of the loads to be weighed, the movement desirable for the dashpot plunger to obtain maximum damping benefit and the fact that virtually no movement of the lever at the pressure transducer is required.

It has been found that many advantages are obtained when the pivot used for the main frame comprises a vertical flexure strip in tension. To this may be added a horizontal flexure strip to stabilise the frame. Similarly the hinge coupling the flexible lever to the main frame preferably comprises a horizontal flexure strip. This absence of knife edges or bearings increases the ruggedness of the machine and enables it to withstand extreme conditions of dust, vibration and corrosion.

By combination with suitable instruments any of the functions indication, recording, controlling or integrating, may be performed by the machine of the present invention, either singly or in combination. As an example the machine may be used in a solids feeder to control the amount of solids fed from a hopper on to a conveyor. In such a feeder the machine is used in conjunction with a three-term controller, an air loading station and a power cylinder. The output from the pressure transducer, in this case a pneumatic force-balance transmitter, is piped to the three term controller which receives a desired value signal from the remote air loading recorder station. The controller output is connected to and operates a power cylinder which in turn operates a hopper gate. The hopper gate controls the flow of solids on to the conveyor.

The drawings accompanying the specification illustrate a particular embodiment of the machine of the present invention.

FIGURE 1 is a side elevation of a weighing machine according to the present invention.

FIGURE 2 is an end elevation of the same weighing machine.

FIGURE 3 is a top plan view of the lever system and transducer of the weighing machine of FIGS. 1 and 2; and FIGURE 4 is a side elevation view, on a somewhat larger scale, of the cross flexure strip used on the weighing machine of FIGS. 1–3. Referring to the figures, the weighing machine is seen to be supported by a supporting structure in the form of a framework comprising T-bars 1 and 2, tie rods 3 coupling T-bars 1 and 2, and a vertical member 4. Welded to T-bar are vertical member 5 which support a horizontal beam 7 along which a moveable fulcrum 8 can be positioned. The fulcrum 8 is locked in position on beam 7 by means of a bolt 9 which bears on one side of a V-shaped groove cut in beam 7.

A load arm 10 which forms part of a lever system is pivoted to vertical member 4 by means of a cross flexure strip bearing 11, and similarly at the other side. It will be seen that cross flexure strip bearing 11 consists of a vertical flexure strip 24 and a horizontal flexure strip 25. The vertical flexure strip 24 is fastened by bolts 26 through a plate 32 to a projection 27 which is integral with a flame member E on member 4 and by bolts 28 through a plate 33 to the vertical member of an angle plate 29 which is welded to frame 10. The horizontal flexure strip 25 is fastened by bolts 30 through a plate 34 to projection 27 which is integral with member 4 and by bolts 31 through plate 35 to the horizontal member of the angle plate 29. The load arm 10 which is a frame structure 10 carries trough or flat belting idling roller 12, which is supported by a cross-member 13. A power arm of the lever system in the form of a flexible beam 14 is hinged by horizontal flexure strip 15 to an extension 16a on an angle girder A welded onto load arm 10, part 15a of the flexure strip being secured by bolts 15c and the part 15b being secured by bolts 15d. The flexible beam 14 pivots about an adjustable fulcrum 8 and operates a pressure transducer 17 via rod 18. Flexure strip 15, fulcrum 8 and flexure strip bearing 11 are in the same horizontal plane.

A dashpot 19 is fixed to T-bar 1. The piston rod 21 is connected to the load arm 10 at 22. The damping offered by the dashpot is variable, the piston being provided with holes the area of which can be altered so varying the resistance of the piston to motion.

Load arm 10 is balanced about bearing 11 by the provision of a counterweight (not illustrated) on arm 20 of load arm 10. This counterweight is adjustable.

In operation the weighing machine is positioned beneath a conveyor belt, the idling rollers 12 bearing against the underside of the conveyor. The load on the conveyor is transmitted to the idling rollers 12 and in consequence the load arm 10 pivots about flexure strip bearings 11, this movement being damped by dashpot 19. The movement of load arm 10 operates through hinge 15 to pivot flexible beam 14 about fulcrum 8 and so operates pressure transducer 17.

Before using the machine of the present invention it is first calibrated. This is done by adjusting fulcrum 8 to give maximum reading on the pressure transducer for the anticipated maximum load to be carried. The higher the maximum load that is to be carried the nearer the fulcrum 8 will be to hinge 15, which in turn means that, although the maximum load is greater, the maximum displacement of roller 12 will still be the same.

In order that the pressure transducer can follow load changes accurately, it is essential that the displacement of rod 18 should not change at a greater rate than one thousandth inch in four seconds when an instantaneous increase in weight is applied to roller 12. It is impracticable to arrange direct damping for such a small movement.

It will be seen that this damping of sudden weight changes on roller 12 is obtained by the machine of the present invention by interposing spring beam 14 between the motion of roller 12 and motion of rod 18. The dashpot 19 is allowed a movement for full load changes on roller 12 of up to 0.1 inch which is easy to damp efficiently. This damped motion is then converted by the flexibility of beam 14, into a force applied to rod 18, not causing excessive displacement of rod 18.

The greater the maximum load the more flexible is the beam 14 acting on the pressure transducer 17 so reducing the displacement of rod 18 proportionately. The machine of the present invention therefore ensures that, by adjustment of fulcrum 8, the maximum vertical movement of load arm 10 is kept constant over a wide range of loads on the conveyor belt. This adjustment of the fulcrum whilst varying moments about the fulcrum also proportionately varies the characteristics of beam 14 as a spring.

In a typical machine which measures loads of 6–60 pounds the maximum deflection of beam 14 at end 15 is a constant 0.1 inch when the beam of spring steel has a cross-section of 1¼ inch by ¼ inch and a length of 12 inches. Other dimensions of this machine were—pivot to dashpot 15 inches, pivot to roller 19.5 inches and pivot to pressure transducer 3 inches. Lesser deflections can be obtained by increasing the thickness of the spring beam. Deflections down to 0.02 inch may be used for special purposes when it is desired to minimise movement of the weighing idler relative to the conveyor belt idlers on either side, in order to avoid errors due to varying belt tension.

I claim:

1. A weighing machine adapted to measure continuously the load on a given length of conveyor belt, said machine comprising a supporting structure, a fulcrum attached to said supporting structure, a flexible lever pivoted about said fulcrum, a transducer on said supporting structure, means extending between the presure transducer and one end of said flexible lever and contacted at all times by said one end, a pivot attached to said supporting structure, a main frame balanced about said pivot, a hinge connecting the other end of said flexible lever to said main frame, a dashpot connected between said main frame and said supporting structure and an idler roller mounted on one end of said main frame, said idler roller being adapted to bear against the underside of said conveyor belt and said dashpot and said idler roller being on the same side of the pivot as the hinge between the flexible lever and the main frame.

2. A weighing machine as claimed in claim 1 wherein said flexible lever is in the same plane as said pivot.

3. A weighing machine adapted to measure continuously the load on a given length of conveyor belt, said machine comprising a supporting structure, a fulcrum attached to said supporting structure, a flexible lever pivoted about said fulcrum, a pneumatic force-balance transmitter on said supporting structure, means extending between the pneumatic force-balance transmitter and one end of said flexible lever and contacted at all times by said one end, a pivot attached to said supporting structure, main frame balanced about said pivot, a hinge connecting the other end of said flexible lever to said main frame, a dashpot connected between said main frame and said supporting structure and an idler roller mounted on one of said main frame, said idler roller being adapted to bear against the underside of said conveyor belt, said dashpot and said idler roller being on the same side of the pivot as the hinge between the flexible lever and the main frame, and said flexible lever being in the same plane as said pivot.

4. A weighing machine adapted to feasure continuously the load on a given length of conveyor belt, said machine comprising a supporting structure, a fulcrum attached to said supporting structure, a flexible lever pivoted about said fulcrum, a pressure transducer on said supporting structure, means extending between the pressure transducer and one end of the flexible lever and contacted at all times by said one end, a pivot attached to the supporting structure, a main frame balanced about said pivot, a hinge connecting the load arm of said flexible lever to said main frame, a dashpot connected between said main frame and said supporting structure and an idler roller mounted on one end of said main frame, said idler roller being adapted to bear against the underside of said conveyor belt, said dashpot and said idler roller being on the same side of the pivot as the hinge between the flexible lever and the main frame, said flexible lever being in the same plane as said pivot.

5. A weighing machine adapted to measure continuously the load on a given length of conveyor belt, said machine comprising a supporting structure, an adjustable fulcrum attached to said supporting structure, a flexible lever pivoted about acid fulcrum, a pressure transducer on said supporting structure, means extending between the pressure transducer and one end of the flexible lever and contacted at all times by said one end, a pivot attached to the supporting structure, a main frame balanced about said pivot, a hinge connecting the load arm of said flexible lever to said main frame, a dashpot connected between said main frame and said supporting structure and an idler roller mounted on one end of said main frame, said idler roller being adapted to bear against the underside of said conveyor belt, said dashpot and said idler roller being on the same side of the pivot as the hinge between the flexible lever and the main frame, said flexible lever being in the same plane as said pivot.

6. A weighing machine adapted to measure continuously the load on a given length of conveyor belt, said machine comprising a supporting structure, an adjustable fulcrum attached to the supporting structure, a flexible lever pivoted about said fulcrum, a pressure transducer on said supporting structure, means extending between the pressure transducer and one end of the flexible lever and contacted at all times by said one end, a main frame, a vertical flexure strip attached to the supporting structure and to said main frame, a horizontal flexure strip connecting the load arm of said flexible lever to said main frame, a dashpot connected between said main frame and said supporting structure and an idler roller mounted on one end of said main frame, said idler roller being adapted to bear against the underside of said conveyor belt, said dashpot and said idler roller being on the same side of the pivot as the horizontal flexure strip between the flexible lever and the main frame, said flexible lever being in the same plane as said pivot and said main frame being balanced about said vertical flexure strip.

7. A weighing machine adapted to measure continuously the load on a given length of conveyor belt, said machine comprising a supporting structure, an adjustable fulcrum attached to the supporting structure, a flexible lever of spring steel pivoted about said fulcrum, a pneumatic force-balance transmitter on said supporting structure, means extending between the pneumatic force-balance transmitter and one end of the flexible lever and contacted at all times by said one end, a main frame, a vertical flexure strip attached to the supporting structure and to a main frame, a horizontal flexure strip connecting the load arm of said flexible lever to said main frame, a dashpot connected between said main frame and said supporting structure and an idler roller mounted on one end of said main frame, said idler roller being adapted to bear against the underside of the conveyor belt, said dashpot and said idler roller being on the same side of the pivot as the horizontal flexure strip between the flexible lever and the main frame, said flexible lever being in the same plane as said pivot and said main frame being balanced about said vertical flexure strip.

References Cited in the file of this patent

UNITED STATES PATENTS

| 849,418 | Nickerson | Apr. 9, 1907 |
|---|---|---|
| 928,491 | Bottcher | July 20, 1909 |
| 1,905,558 | Foote | Apr. 25, 1933 |
| 2,228,068 | White | Jan. 7, 1941 |
| 2,681,763 | Saxe | June 22, 1954 |
| 2,918,269 | Williams | Dec. 22, 1959 |

FOREIGN PATENTS

| 475,264 | Canada | July 17, 1951 |
|---|---|---|
| 702,891 | Great Britain | Jan. 27, 1954 |
| 584,901 | Germany | Sept. 26, 1933 |
| 1,085,343 | Germany | July 14, 1960 |
| 1,009,035 | France | Feb. 27, 1952 |